United States Patent [19]

Orrhammar

[11] 4,197,534

[45] Apr. 8, 1980

[54] CONTROL APPARATUS FOR DISPLAYING ALPHANUMERIC CHARACTERS

[75] Inventor: Hans Orrhammar, Grottaferrata, Italy

[73] Assignee: Organisation Europeenne de Recherches Spatiales, Paris, France

[21] Appl. No.: 859,905

[22] Filed: Dec. 12, 1977

[30] Foreign Application Priority Data

Dec. 13, 1976 [BE] Belgium .............................. 0173200

[51] Int. Cl.[2] .................................................. G06F 3/14

[52] U.S. Cl. .................................... 340/721; 340/749; 340/750; 340/799; 400/83; 400/111

[58] Field of Search ................ 340/324 AD, 721, 734, 340/745, 747, 749, 750, 793, 798, 799, 790, 803; 400/109, 111, 110, 83; 364/521

[56] References Cited

U.S. PATENT DOCUMENTS

| | | | |
|---|---|---|---|
| 3,643,252 | 2/1972 | Roberts, Jr. | 340/324 AD |
| 3,955,189 | 5/1976 | Thomson | 340/324 AD |
| 4,075,422 | 2/1978 | Baker | 178/23 R |

OTHER PUBLICATIONS

IBM Technical Disclosure Bulletin, vol. 10, No. 8, Jan. 1978, p. 1299, Olami, D., "Dual Motion Typewriter."

*Primary Examiner*—Gareth D. Shaw
*Assistant Examiner*—Joel Miller
*Attorney, Agent, or Firm*—Sughrue, Rothwell, Mion, Zinn and Macpeak

[57] ABSTRACT

An apparatus is described which permits a dual display on two pages one next to the other on a cathode ray tube. During the scanning of each line of n characters, the address of the character position k, where k is lower than n, is detected and in response to this detection, a signal is generated for stopping the counting of the character positions during a predetermined time. Thereafter, the address of the character position (k+1) is detected and in response to this second detection, an inhibit signal is produced for the duration of the stop signal for inhibiting the illumination of the spot on the CRT screen. Also the addresses of character positions o-k are converted into addresses of character positions n through (k+1) respectively in response to a select signal indicating the selection of one of the pages on the CRT screen.

4 Claims, 2 Drawing Figures

CONTROL APPARATUS FOR DISPLAYING ALPHANUMERIC CHARACTERS

FIELD OF THE INVENTION

The present invention relates to a display control apparatus to be used with a display terminal for automatically displaying one next to the other on a cathode ray tube at least two messages formed with alphanumerical characters which are in alignment along two different directions.

An examplary application of this apparatus is displaying one next to the other on a display screen a message formed with latin characters which are read from left to right and a message formed with arabic characters which are read from right to left.

In order to appreciate the technical problem connected to such a realization it will be kept in mind that displaying on a screen is done with the help of a cathodic beam which is caused to scan the screen line by line under control of a timing clock, following a uniform way of progression which usually is from left to right as seen by the viewer. Consequently, the display of a message which is to be read from left to right, for instance a message in latin characters, is quite usual. But heretofore no apparatus has been provided which permits to display on a cathode ray tube concurrently and one next to the other a message which is to be read from left to right and a message which is to be read along another direction, for instance from right to left.

SUMMARY OF THE INVENTION

The invention has for object a control apparatus which automatically permits such a dual display to be made one next to the other on a cathode ray tube screen.

In accordance with the invention there is provided means for detecting, along each line of n characters, the address of a character position k, where k is lower than n, and in response to said detection, producing a signal for stopping the counting of the character positions and causing this stop signal to last for the scanning time corresponding to at least one character width. Second means are provided for detecting the address of character position (k+1) and, in response to this detection, producing an inhibit signal for the duration of the stop signal for inhibiting the illumination of the spot on the screen. Third means are provided for converting the addresses of character positions o through k into the addresses of character positions n through (k+1) respectively in response to a select signal indicating the selection of one of the pages on the CRT screen.

The apparatus of the invention can be used for various interesting and useful purposes: for instance, as a visual display terminal in the telecommunication field, as an airport flight display device and as a visual display desk for translators and interpreters.

DESCRIPTION OF AN EXEMPLARY EMBODIMENT

Figure 1:
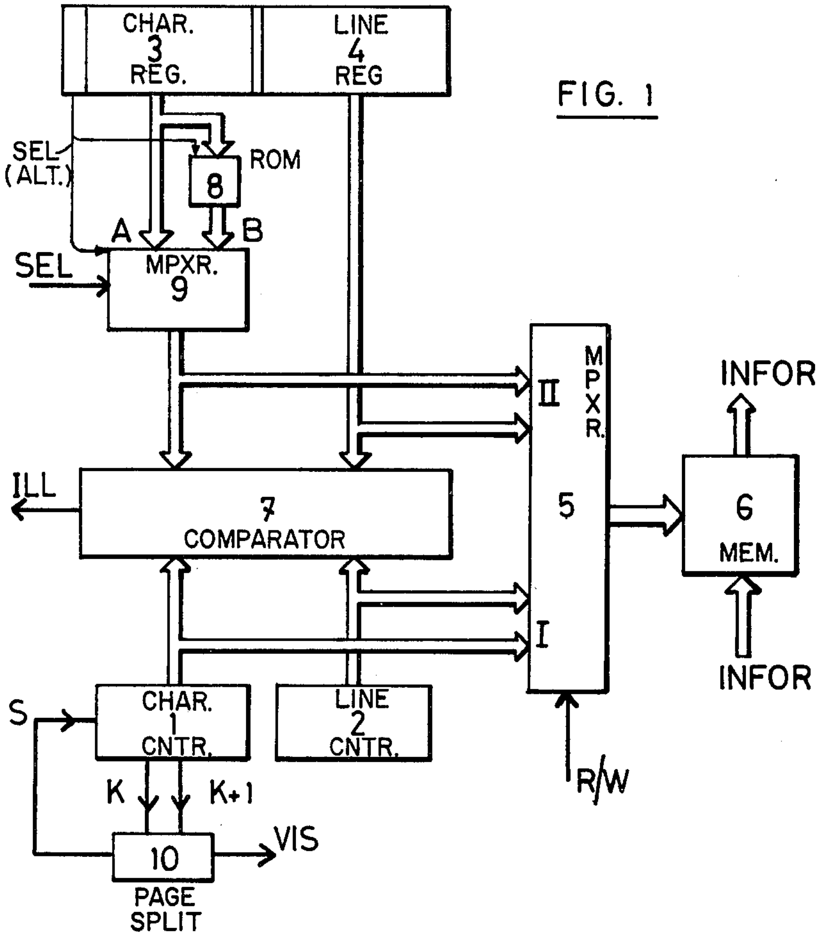
FIG. 1 is a block diagram of the apparatus according to the invention.

The description hereafter relates particularly to an embodiment adapted for displaying a message using latin characters on the left hand portion of a screen and a message using arabic characters on the right hand portion of the screen. It will be assumed that the display terminal comprises a cathode ray tube, the beam of which is controlled to scan the screen along parallel horizontal lines and is capable of displaying twenty four lines of eighty characters each. The screen is subdivided into two fields A and B, one next to the other, each being capable of displaying lines having a length of forty characters. In the following, the left hand field A will be referred to as page 1 and the right hand field B will be referred to as page 2.

Before describing the apparatus of the invention it may be useful to remember briefly some basic features relating to the cathode ray tube display technics. In a CRT display terminal, the display of characters is under the control of a control unit which subdivides the display screen area into a number of successive character positions along horizontal lines. In the illustrative embodiment, each line has eighty positions. Each character position is determined by an address which defines that position on a horizontal line and the position of said horizontal line on the screen. For being able to determine the character positions on the screen, the control unit thus comprises a character counter which advances by one count for each succeeding character position on a horizontal line and which is then reset for starting at the following line, and a line counter which advances by one count for each line position on the screen. Furthermore, as the scanning starts from outside the viewable area of the screen, the beam scanning path is longer than the width of said viewable area of the screen and therefore the control unit comprises logic means for enabling the spot illumination in said viewable area of the screen only. In the examplary embodiment, the character counter is arranged to count from 0 through 79 for each line on the screen and the line counter is arranged to count from 0 through 23, and thereafter they reset.

The characters to be displayed are stored at defined locations in a memory through a cursor address register having a field which defines the character addresses and a field which defines the line addresses. Displaying a character is made by reading out the memory locations and causing the selected character to appear at a display position which is determined by the contents of the character and line counters. The information from the memory controls a character generator which is responsive thereto for generating the dot configuration which will make the selected character to be displayed.

Now referring to FIG. 1, there is shown a character counter 1, a line counter 2 and a cursor address register comprised of a character register 3 and a line register 4. The invention is particularly concerned with the character counter 1 and the character register 3.

The character counter 1 provides the addresses of the succeeding display positions and the character register 3 provides the addresses of the succeeding locations in the memory whereat the characters to be displayed are stored. The outputs from counter 1 and from register 3 are coupled to distinct inputs I and II of a multiplexer 5. The outputs from the latter are connected to the address inputs of a memory 6. This memory is subdivided into two fields A and B which are associated with said pages 1 and 2, respectively, on the display screen (not shown). The multiplexer 5 is connected for coupling the inputs I to its output in response to a read signal R and for coupling its inputs II to output in response to a write signal W.

As is conventional in the art the outputs from the character counter 1, the line counter 2 and the address registers 3 and 4 are also coupled to comparator means 7 which is arranged for comparing the incoming addresses from the counters 1–2 with those from the registers 3–4 and producing an illumination enable signal ILL to be used for illuminating a cursor on the screen at the address designated by the contents of registers 3 and 4.

Figure 2:
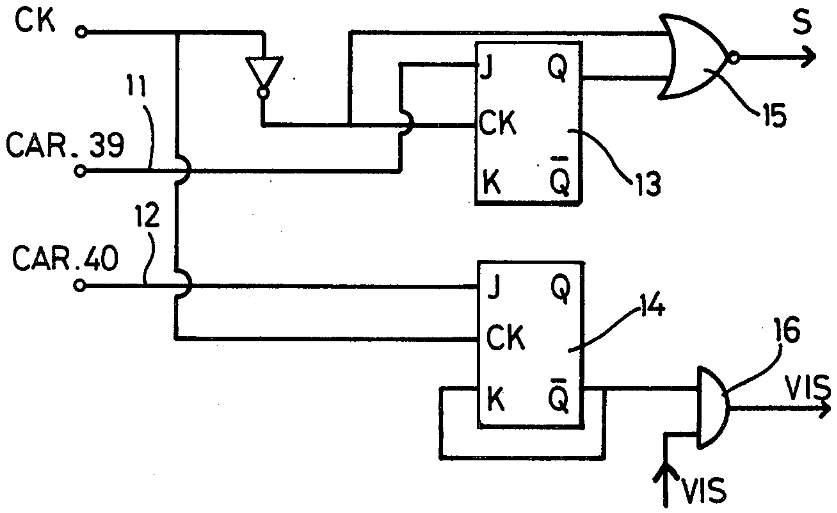
FIG. 2 is a schematic drawing of the control logic for separating the display fields on the screen.

According to the invention, the character counter 1 has a page split device 10 associated therewith. FIG. 2 schematically illustrates an exemplary embodiment for this device. The input line 11 accepts a signal representing the address of character position 39 and the input line 12 accepts a signal representing the address of character position 40. The arrangement essentially comprises two bistable devices 13 and 14 which are controlled by clocking signals applied to inputs CK thereof, and two logic gates: NOR gate 15 and AND gate 16. When the counter 1 reaches the count 39, i.e. the last character position on a line on page 1 in the example described, a signal appears on input line 11 whereby a stop signal S is produced at the output from gate 15. This S signal serves to stop the counter 1 for a scanning time interval corresponding to one or several character cycles, i.e. one character width or a multiple of said width in order to keep a free space between the pages 1 and 2 on the display screen, said space having the width of one or several characters. The duration of this stop signal S is called inhibition time Ti.

Inasmuch as shift registers are normally used to serialize the groups of points generated by the character generators, one character is displayed one character cycle after the actual address defined by the character and line counters. Therefore, for preventing the last character on each line on page 1 from being repeated during the inhibition time Ti, the bistable device 14 is connected to accept a signal representing the character position 40 in counter 1. In response to this signal applied on input line 12, the bistable device 14 switches and produces a signal which disables AND gate 16 during the inhibition time Ti. This blocking signal is thus effective to prevent, during the time Ti, the transmission of the spot enable signal VIS applied as a second input to gate 16 and provided from the logic means which control the spot illumination.

When the time Ti has elapsed, the bistable device 13 is reset, the S signal is canceled and the counter 1 resumes its advancing. At the same time the bistable device 14 cancels the blocking signal at the output thereof whereby the spot is illuminated again.

According to the invention, the apparatus further comprises means for inverting the direction of display of the succeeding characters along the lines on page 2 of the display screen. For that purpose, the addresses of the locations in memory 6 where the characters to be displayed on page 2 are stored, have to be inverted. That is, the content of the character register 3 has to be inverted for the character positions on page 2 of the display screen. Therefore, address converter means are connected between the character register 3 and the comparator means 7. These address converter means as shown in FIG. 1 comprise a read-only memory 8 associated with a multiplexer means 9. The character register 3 is arranged for storing the succeeding addresses 0 through 39 only and it has its outputs connected on one hand to a first group A of inputs to the multiplexer 9 and on the other hand to inputs to the read-only memory 8. The outputs from ROM 8 are coupled to a second group B of inputs to the multiplexer 9.

In an examplary embodiment the ROM 8 can be made to store the addresses of character positions 79, 78, . . . 40 in locations having respective addresses which correspond to the character positions 0, 1, 2, . . . 39. Thereby for the character position address 0 at the output from register 3, for instance, said address 0 is applied to inputs A to the multiplexer 9 while the character position address 79 is applied to inputs B to the multiplexer 9; for the address 1 at the output from register 3, the inputs A accept this address 1 while the inputs B accept the address 78, and so on up to the address 39 from register 3 which is coupled to inputs A to the multiplexer 9 while the inputs B thereto accepts the address 40. The multiplexer 9 is connected for responding to a control signal, i.e. the page select signal SEL, and for coupling to the comparator means 7 either the address applied at its inputs A (address provided from register 3) or the address applied at its inputs B (address provided from ROM 8). When SEL signal has a state representing the selection of page 1 on the screen, the characters to be displayed are read in and read out successively at the addresses defined by the content of register 3, that is at the character positions 0, 1, . . . 38, 39. When SEL signal has a state representing the selection of page 2 on the screen, the characters are read in and out successively at the addresses provided from ROM 8, that is at the character positions 79, 78, . . . 41, 40.

In another embodiment the selection signal SEL can advantageously be the most significant bit of the address work provided by the character register 3, said SEL bit being made to be 0 for displaying on page 1 and to be 1 for displaying on page 2. In this case, the ROM 8 has to be organized for providing the succeeding addresses 79, 78, . . . 41, 40 when the said SEL bit is 1. With the control apparatus according to the invention, the characters read out from the memory 6 are appearing on the cathode ray screen successively in positions 0, 1, 2, . . . 38,39 on each line on page 1 and they are appearing in positions 79, 78, . . . 41, 40 on each line on page 2 of the screen. In this way, each character line on page 1 starts from the left hand side and each succeeding character appears at the right of the preceding character whereas each character line on page 2 starts from the right hand side and each succeeding character appears at the left of the preceding character.

Obviously, the selection of one or the other page on the screen is on a par with the selection of a respective character generator: in the particular examplary embodiment described in the foregoing, a latin character generator for display on page 1 and an arabic character generator for display on page 2. Such character generators are devices well known in the art which need no detailed description here.

It is to be understood that variations can be made to the described examplary embodiment. For instance, the characters to be displayed on pages 1 and 2 of the screen may be of any kind different from latin and arabic characters. Also the number of characters to be displayed on each line is quite indifferent for the object of the invention as does the number of lines on each page.

What is claimed is:

1. A control apparatus for displaying alphanumeric characters on a cathode ray tube in a plurality of lines of n characters each, said apparatus comprising a character counter for counting the character positions along each display line and a character address register for storing the succeeding addresses of the locations in a memory containing the characters to be displayed, first means connected at the outputs from the character counter for detecting the address of character position k, where k is lower than n, and producing a stop signal for said counter when the latter reaches a count of k, said first means being arranged for holding the stop signal during a predetermined time equal to the scanning time corresponding to at least one character width, and second means connected at the outputs from the character counter for detecting the address of character position (k+1) and producing an inhibit signal during the occurrence of the stop signal, said inhibit signal serving to inhibit the illumination of the spot on the cathode ray tube thereby to prevent a same character to be displayed repeatedly while the character counter is stopped, and comparator means coupled to the outputs from the character counter and the character address register for producing an illumination enable signal in response thereto.

2. A control apparatus according to claim 1, wherein the character address register means is connected for storing the succeeding addresses for k characters, and further comprising third means connected to the outputs from the character address register for converting the addresses of character positions o through k into addresses of character positions n through (k+1), respectively, and fourth means having a first and a second group of inputs, the inputs of the first group being connected to the outputs from the character address register and the inputs of the second group being connected to the outputs from said third means, the fourth means being connected for being responsive to a select signal for interconnecting its outputs to the inputs of the first group when said select signal has a first state and for interconnecting its outputs to the inputs of the second group when said select signal has a second state.

3. A control apparatus according to claim 2, wherein the third means comprises a read-only memory storing the addresses of character positions n, (n−1), . . . through (k+1) at locations designated by the addresses of character positions 0, 1, 2, . . . through k, respectively.

4. A control apparatus according to claim 2, wherein the select signal is formed by the most significant bit of the content of said character address register.

* * * * *